United States Patent [19]

Doré

[11] Patent Number: 5,092,905
[45] Date of Patent: Mar. 3, 1992

[54] MIXTURES OF AT LEAST THREE ANIONIC DYES AND THEIR USE FOR DYEING NATURAL AND SYNTHETIC POLYAMIDES

[75] Inventor: Jacky Doré, Basel, Switzerland
[73] Assignee: Sandoz Ltd., Basel, Switzerland
[21] Appl. No.: 592,943
[22] Filed: Oct. 4, 1990
[30] Foreign Application Priority Data Oct. 6, 1989 [DE] Fed. Rep. of Germany ....... 3933338

[51] Int. Cl.$^5$ ............................................. C09B 43/28
[52] U.S. Cl. ......................................... 8/638; 8/639; 8/641; 8/643; 8/676; 8/679; 8/681; 8/682; 8/683; 8/687; 8/917; 8/924
[58] Field of Search .................. 8/638, 641, 643, 639

[56] References Cited

U.S. PATENT DOCUMENTS

| | | | |
|---|---|---|---|
| 3,778,453 | 12/1973 | Hindermann et al. | 552/229 |
| 3,862,119 | 1/1975 | Stingl | 534/831 |
| 3,891,619 | 6/1975 | Sommer et al. | 534/790 |
| 3,932,378 | 1/1976 | Fasciati | 8/681 |
| 4,060,383 | 11/1977 | Ridyard | 8/683 |
| 4,146,363 | 3/1979 | Harms et al. | 8/641 |
| 4,384,870 | 5/1983 | Benguerel | 8/540 |
| 4,402,704 | 9/1983 | Raisin et al. | 8/641 |
| 4,445,905 | 5/1984 | Schaetzer et al. | 8/641 |
| 4,537,598 | 8/1985 | Schaetzer et al. | 8/641 |
| 4,579,561 | 4/1986 | Rowe et al. | 8/641 |
| 4,652,269 | 3/1987 | Bowles et al. | 8/641 |
| 4,757,137 | 7/1988 | Wolfrum et al. | 534/862 |
| 4,773,914 | 9/1988 | Harms et al. | 8/641 |
| 4,840,643 | 6/1989 | Rowe | 8/641 |
| 4,954,563 | 9/1990 | Hurter | 534/783 |

Primary Examiner—A. Lionel Clingman
Attorney, Agent, or Firm—Gerald D. Sharkin; Richard E. Vila; Melvyn M. Kassenoff

[57] ABSTRACT

Dye mixtures comprising
(i) as a yellow component, at least one compound of the formula

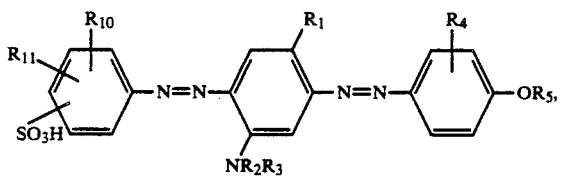

or a salt thereof, wherein
$R_1$ is hydrogen, $C_{1-4}$alkoxy, $C_{1-4}$alkyl or $C_{1-4}$alkyl monosubstituted by halo,
$R_2$ is $C_{1-4}$alkyl or —$COR_6$,
wherein $R_6$ is $C_{1-6}$alkyl, $C_{1-6}$alkoxy or —$NR_7R_8$, wherein each of $R_7$ and $R_8$ is independently hydrogen, $C_{1-6}$-alkyl or $C_{2-6}$alkyl mono-substituted by hydroxy,
$R_4$ is hydrogen, halo, $C_{1-4}$alkyl, $C_{1-4}$alkoxy or —$NR_3R_9$,
$R_5$ is $C_{1-4}$alkyl or $C_{2-6}$alkyl monosubstituted by hydroxy,
$R_{10}$ is hydrogen, halo, $C_{1-4}$alkyl, $C_{1-4}$alkoxy or —$NR_3R_9$, and
$R_{11}$ is hydrogen, halo, $C_{1-4}$alkyl or $C_{1-4}$alkoxy, wherein
each $R_3$ is independently hydrogen or $C_{1-4}$alkyl, and
each $R_9$ is independently ($C_{1-6}$alkyl)carbonyl or ($C_{1-6}$alkoxy)carbonyl, (ii) as a red component, at least one compound of the formula

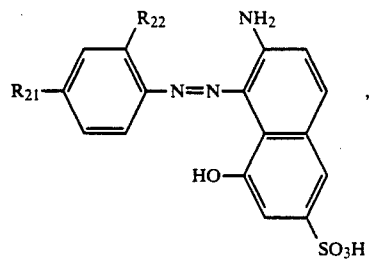

or a salt thereof, wherein
$R_{21}$ is hydrogen, halo or ($C_{1-4}$alkyl)carbonylamino, and
$R_{22}$ is trifluoromethyl, —$SO_2Z_1$ or —$SO_2Z_2$, wherein
$Z_1$ is phenyl, phenoxy or —$NR_{19}R_{20}$, wherein
$R_{19}$ is methyl or ethyl, and
$R_{20}$ is phenyl or cyclohexyl, and
$Z_2$ is —$N(C_4H_9)_2$ or

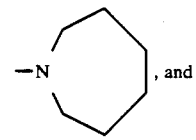 , and (iii) as a blue component, at least one compound of the formula

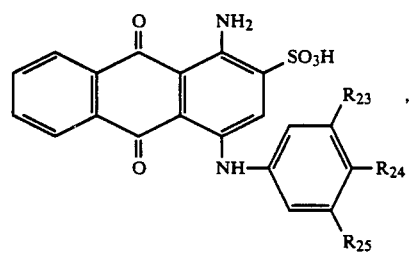

or a salt thereof, wherein
$R_{23}$ is hydrogen or methyl, and
one of $R_{24}$ and $R_{25}$ is $C_{2-4}$hydroxyalkylsulfamoyl or —$NR_{26}$—$COC_{1-4}$alkyl and the other is hydrogen or methyl, wherein $R_{26}$ is hydrogen, methyl or ethyl, useful for dyeing and printing nitrogen-containing organic substrates, especially natural and synthetic polyamides.

29 Claims, No Drawings

MIXTURES OF AT LEAST THREE ANIONIC DYES AND THEIR USE FOR DYEING NATURAL AND SYNTHETIC POLYAMIDES

The invention relates to combinable anionic dye mixtures and their use for dyeing or printing nitrogen-containing organic substrates, especially in trichromatic dyeing processes.

More particularly, this invention provides a process for the trichromatic dyeing or printing of a nitrogen-containing organic substrate, preferably natural or synthetic polyamide material, comprising applying to a substrate an anionic dye mixture containing (i) at least one dyestuff of formula Ia as yellow component

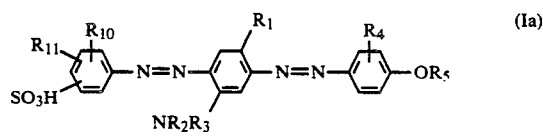

which is in free acid or salt form, in which
- $R_1$ is hydrogen, $C_{1-4}$alkoxy, unsubstituted $C_{1-4}$alkyl or $C_{1-4}$alkyl monosubstituted by halogen,
- $R_2$ is $C_{1-4}$alkyl or $-COR_6$,
  wherein $R_6$ is $C_{1-6}$alkyl, $-OC_{1-6}$alkyl or $-NR_7R_8$,
  wherein each of $R_7$ and $R_8$ is independently hydrogen, unsubstituted $C_{1-6}$alkyl or monohydroxy-substituted $C_{2-6}$alkyl,
- $R_3$ is hydrogen or $C_{1-4}$alkyl,
- $R_4$ is hydrogen, halogen, $C_{1-4}$alkyl, $C_{1-4}$alkoxy or $-NR_3R_9$ in which $R_3$ is as defined above but independent thereof and $R_9$ is $-COC_{1-6}$alkyl or $-COOC_{1-6}$alkyl,
- $R_5$ is $C_{1-4}$alkyl or monohydroxy-substituted $C_{2-6}$alkyl,
- $R_{10}$ is hydrogen, halogen, $C_{1-4}$alkyl, $C_{1-4}$alkoxy or $-NR_3R_9$ in which $R_3$ and $R_9$ are as defined above but independent thereof, and
- $R_{11}$ is hydrogen, halogen, $C_{1-4}$alkyl or $C_{1-4}$alkoxy;

optionally together with at least one yellow to orange dyestuff of the following formulae Ib to Ie,

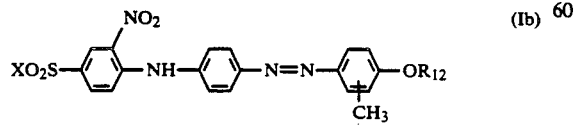

in which
- X is hydroxy or $-NHSO_2C_{1-4}$alkyl, and
- $R_{12}$ is hydrogen or $C_{1-4}$alkyl;

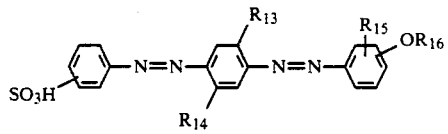

in which
each of $R_{13}$, $R_{14}$ and $R_{15}$ is independently hydrogen, $C_{1-4}$alkyl or $C_{1-4}$alkoxy, and
$R_{16}$ is $C_{1-4}$alkyl or $C_{2-4}$hydroxyalkyl;

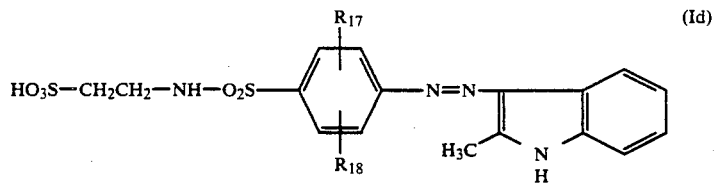

in which
each of $R_{17}$ and $R_{18}$ is independently hydrogen, halogen or $C_{1-4}$ alkyl;

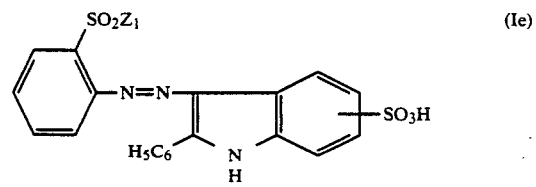

in which
$Z_1$ is phenyl, phenoxy or $-NR_{19}R_{20}$,
wherein $R_{19}$ is methyl or ethyl, and
$R_{20}$ is phenyl or cyclohexyl;
which dyestuffs of formulae Ib to Ie are in free acid or salt form; together with (ii) at least one dyestuff of formula II as red component

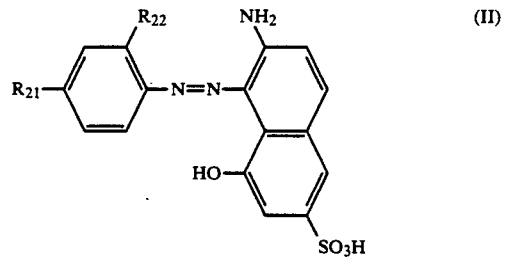

which is in free acid or salt form, in which
$R_{21}$ is hydrogen, halogen or $-NHCOC_{1-4}$alkyl, and
$R_{22}$ is trifluoromethyl, $-SO_2Z_1$ or $-SO_2Z_2$ in which $Z_1$ is as defined above and
$Z_2$ is $-N(C_4H_9)_2$ or

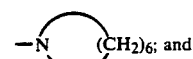 ; and (iii) at least one dyestuff of formula III as blue component

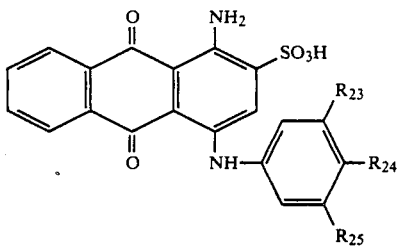

(III)

which is in free acid or salt form, in which $R_{23}$ is hydrogen or methyl, one of $R_{24}$ and $R_{25}$ is —$SO_2NHC_{2-4}$hydroxyalkyl or —$NR_{26}COC_{1-4}$alkyl in which $R_{26}$ is hydrogen, methyl or ethyl, and the other is hydrogen or methyl.

In the specification, any unsubstituted or substituted alkyl or alkoxy group present is linear or branched unless indicated to the contrary.

Any halogen is preferably fluorine, chlorine or bromine, especially chlorine.

In any hydroxy-substituted alkyl group which is attached to nitrogen, the hydroxy group is preferably bound to a carbon atom which is not directly attached to the nitrogen atom.

In any hydroxy-substituted alkyl group as $R_5$ or $R_{16}$, the hydroxy group is preferably bound to a carbon atom which is not directly attached to the phenoxy group.

In a compound of formula Ia:

$R_1$ is preferably $R_{1a}$, where $R_{1a}$ is hydrogen, methyl or methoxy. Most preferably $R_1$ is hydrogen.

Preferably each of $R_7$ and $R_8$ is $R_{7a}$ and $R_{8a}$, where each of $R_{7a}$ and $R_{8a}$ is independently hydrogen, $C_{1-2}$alkyl or $C_{2-3}$hydroxyalkyl. More preferably $R_7$ is $R_{7b}$, where $R_{7b}$ is hydrogen or methyl and $R_8$ is hydrogen.

$R_6$ is preferably $R_{6a}$, where $R_{6a}$ is $C_{1-2}$alkyl, —$OC_{1-2}$alkyl or —$NHR_{7b}$ in which $R_{7b}$ is as defined above; more preferably it is $R_{6b}$, where $R_{6b}$ is $C_{1-2}$alkyl or —$NH_2$. Most preferably $R_6$ is methyl.

$R_2$ is preferably $R_{2a}$, where $R_{2a}$ is —$COR_{6b}$ in which $R_{6b}$ is as defined above. Most preferably $R_2$ is —$COCH_3$.

Each $R_3$ is preferably $R_{3a}$, where each $R_{3a}$ is independently hydrogen or methyl. Most preferably each $R_3$ is hydrogen.

$R_9$ is preferably $R_{9a}$, where $R_{9a}$ is —$COC_{1-2}$alkyl or —$COOC_{1-2}$alkyl. More preferably $R_9$ is —$COCH_3$.

$R_4$ is preferably $R_{4a}$, where $R_{4a}$ is hydrogen, chlorine, methyl, methoxy or —$NHCOCH_3$; more preferably $R_4$ is $R_{4b}$, where $R_{4b}$ is hydrogen or methyl. Most preferably $R_4$ is hydrogen.

$R_5$ is preferably $R_{5a}$, where $R_{5a}$ is methyl, ethyl or monohydroxy-substituted $C_{3-5}$alkyl; more preferably it is $R_{5b}$, where $R_{5b}$ is methyl or monohydroxy-substituted $C_4$alkyl; most preferably $R_5$ is

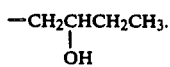

—$CH_2CHCH_2CH_3$.
  |
  OH

Alternatively, $R_5$ is preferably $C_{2-6}$hydroxyalkyl.

$R_{10}$ is preferably $R_{10a}$, where $R_{10a}$ is hydrogen, chlorine, methyl, methoxy or —$NHCOCH_3$; most preferably $R_{10}$ is hydrogen.

$R_{11}$ is preferably hydrogen.

Preferred compounds of formula Ia correspond to formula Ia'

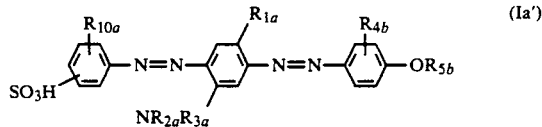

(Ia')

which compounds are in free acid or salt form, in which the sulpho group is meta or para to the carbon atom to which the azo group is attached, and $R_{1a}$, $R_{2a}$, $R_{3a}$, $R_{4b}$, $R_{5b}$ and $R_{10a}$ are as defined above.

More preferred are compounds of formula Ia' in which (1) $R_{1a}$ and $R_{3a}$ are hydrogen and $R_{2a}$ is —$COCH_3$;

(2) $R_{10a}$ is hydrogen;

(3) $R_{4b}$ is hydrogen;

(4) those of (1) to (3) in which $R_{5b}$ is

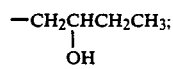

—$CH_2CHCH_2CH_3$;
  |
  OH (5) those of (4) in which the sulpho group is meta to the carbon atom to which the azo group is attached;

(6) each of $R_{1a}$, $R_{3a}$ and $R_{4b}$ is hydrogen, and $R_{5b}$ is

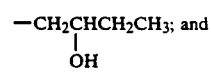

—$CH_2CHCH_2CH_3$; and
  |
  OH (7) those of (6) wherein $R_{10a}$ is hydrogen, and the sulpho group is meta to the —N=N— radical.

In a compound of formula Ib:

X is preferably hydroxy or —$NHSO_2CH_3$ and $R_{12}$ is preferably hydrogen, methyl or ethyl.

In a compound of formula Ic:

The sulpho group is preferably meta or para to the carbon atom to which the azo group is attached.

$R_{13}$ is preferably hydrogen or methoxy, and $R_{14}$ is preferably hydrogen or methyl.

$R_{15}$ is preferably hydrogen.

$R_{16}$ is preferably methyl, ethyl or $C_{2-4}$hydroxyalkyl; more preferably $R_{16}$ is methyl or $C_{3-4}$hydroxyalkyl; and the —$OR_{16}$ radical is preferably ortho or para to the carbon atom to which the azo group is attached.

In a compound of formula Id:

The phenyl substituents $R_{17}$ and $R_{18}$ are preferably para to each other; more preferably they are both chlorine.

In a compound of formula Ie:

$Z_1$ is preferably phenyl.

In a compound of formula II:

$R_{21}$ is preferably hydrogen, chlorine or —NHCOCH_3; more preferably $R_{21}$ is hydrogen and $R_{22}$ is —$SO_2Z_1$ or —$SO_2Z_2$.

Preferred compounds of formula III are those in which (3a) $R_{23}$ is hydrogen, one of $R_{24}$ and $R_{25}$ is acetylamino or propionylamino and the other is hydrogen; or (3b) $R_{23}$ is hydrogen or methyl, $R_{24}$ is methyl and $R_{25}$ is —$SO_2NHCH_2CH_2OH$.

Most preferred is a compound of formula III in which (3c) $R_{23}$ is hydrogen, $R_{24}$ is methyl and $R_{25}$ is —$SO_2NHCH_2CH_2OH$.

Preferably, in the dye mixture used in the process according to the invention, the yellow component of formula Ia is used alone or together with a compound of formula Ib.

The dyes of formulae Ia to Ie, II and III used in the dyeing or printing process may be in free acid or preferably salt form. When they are in salt form, the cation associated with the sulpho group is not critical and may be any one of those non-chromophoric cations conventional in the field of anionic dyes. Examples of such cations are alkali metal cations and unsubstituted or substituted ammonium cations, e.g., lithium, sodium, potassium, ammonium, mono-, di-, tri- and tetra-methylammonium, triethylammonium and mono-, di- and tri-ethanolammonium.

The preferred cations are the alkali metal cations and ammonium, with sodium being the most preferred cation.

The cations associated with the sulpho group can also be a mixture of the above mentioned cations meaning that these compounds can be in a mixed salt form.

The compounds of formulae Ia to Ie, II and III are either known or may be prepared by analogy with known processes. For example, the compounds of formula Ia may be obtained as described in U.S. Pat. No. 4,384,870 by etherifying a compound of formula IV

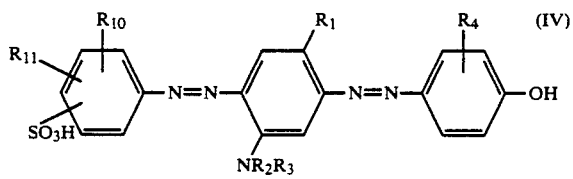

in which $R_1$, $R_2$, $R_3$, $R_4$, $R_{10}$ and $R_{11}$ are as defined above, with the corresponding dialkylsulphate or alkylene oxide.

This etherification is suitably carried out in an aqueous alkaline medium, preferably at pH 9–11, and at a reaction temperature of 30°–100° C., preferably at 50°–80° C. The reaction may also be effected under elevated pressure.

The compounds of formula Ib may be obtained as described in British Patent 1,454,475 and U.S. Pat. No. 4,060,383, the compounds of formula Ic as described in U.S. Pat. Nos. 3,862,119 and 3,932,378 and in British Patent 1,423,629, the compounds of formula Id as described in U.S. Pat. No. 3,891,619, and the compounds of formula Ie as described in European Patent 121495.

The compounds of formula II may be prepared as described in German Patent 702932, U.S. Pat. No. 4,312,808 and British Patent 1,579,414.

The compounds of formula III may be prepared as described in British Patent 1,568,928 and U.S. Pat. No. 3,778,453.

The invention further relates to dye mixtures containing at least one yellow dyestuff of formula Ia optionally together with one or more dyestuffs of formulae Ib to Ie, preferably a dye of formula Ib, together with at least one red dyestuff of formula II and at least one blue dyestuff of formula III, which dyestuffs of formulae Ia to Ie, II and III are as defined above. The dyestuffs are preferably in sodium salt form.

Preferred dye mixtures consist of at least one dye of formula Ia as yellow component, at least one dye of formula II as red component and at least one dye of formula III as blue component, each of which dyes is independently in free acid or salt form.

Also preferred are dye mixtures consisting essentially of at least one dye of formula Ia as yellow component, at least one dye of formula II as red component and at least one dye of formula III as blue component together with at least one dye selected from those of formulae Ib–Ie, each of which dyes is independently in free acid or salt form.

In preferred dye mixtures, the ratio of the individual pure dyestuffs used in the mixture is as follows:

| | |
|---|---|
| at least 10 parts by weight | of the yellow component, a dye of formula Ia alone or together with one or more dyes of formulae Ib to Ie; and |
| 5 to 85 parts by weight | of each of the red and blue components, at least one dye of formula II and at least one dye of formula III, | based on 100 parts total weight of the three components and calculated as if each component were in sodium salt form.

More preferred are trichromatic mixtures in which the ratio of the pure individual dyestuffs is in the range
10–60, more preferably 20–50, parts by weight of the yellow component,
20–70, more preferably 20–45, parts by weight of the red component, and
10–50, more preferably 15–40, parts by weight of the blue component,
based on 100 parts total weight of the three components and calculated as if each component were in sodium salt form (which preferably it is).

With these dye mixtures as described above, dyeings or prints on a natural or synthetic polyamide substrate are obtained showing a wide range of shades, e.g., from pale yellowish-brown to dark bluish-grey.

For use in dyeing as dye mixtures, the individual dyes are mixed together. Stock solutions of the individual dyes of the mixtures may be prepared and used in the dyeing process or, preferably, the dyes may be formulated together in a single stock solution.

Such dye mixtures include, for example, mixtures of appropriate commercial dry (powder, granules) or liquid forms, aqueous stock solutions which contain such mixtures and are obtained, e.g., by dilution with water, and dye liquors or printing pastes which contain the dyestuffs as defined above as a dye mixture.

The dyestuff mixtures may be applied in the appropriate commercial form as described above. They may contain suitable standardising agents such as water-soluble salts (particularly sodium chloride, sodium carbonate and sodium sulphate), non-electrolyte type of standardising agents such as dextrin and urea, and optionally further additives which are suitable for the formulation of solid or liquid preparations. If dyestuffs which are especially low in electrolytes are required, these may be obtained by purification in accordance with known osmotic methods.

Any anionically dyeable substrates are suitable for the dyeing or printing process according to the invention, particularly natural or synthetic polyamides, especially wool, silk, polyamide 6, polyamide 6.6, polyamide 11, Qiana (a polyamide fibre which may be obtained by reacting 4,4'-methylene-bis(cyclohexylamine) with a $C_{12}$ dicarboxylic acid) and mixtures thereof. These substrates may be in any form usually dyed from an aqueous medium, e.g., as loose fibres, yarns, threads, filaments, hanks, spools, fabrics, texture, felts, fleeces, velvet, especially carpets, tufting ware, and semifinished or fully fashioned goods. The fibres may also be pretreated mechanically or with heat, for example, they may be crimped or stretched. Furthermore, even mixtures of different fibres or fibres which are treated in a different way may be used, particularly, when the differential dyeing method is used.

The above mentioned substrates may be dyed according to conventional dyeing methods, for example in accordance with exhaust dyeing from an aqueous dye liquor or by impregnating with an aqueous dye liquor or a dye preparation.

Exhaust dyeing may be effected in accordance with conventional conditions, for example at a temperature of from 40° to 120° C. and at pH 3.5 to 10, preferably at pH 4 to 7. The pH of the dyebath may be adjusted by adding acids usually employed such as formic acid, acetic acid, tartaric acid or citric acid, or a buffer solution such as a phosphate, tartrate or acetate buffer. In case of pH-controlled dyeing processes, the process can be started at pH 7-10 and, subsequently, in the course of the dyeing process, the pH may be lowered to a pH up to 3.5 to 5.5. For the dyeing of synthetic polyamides, the pH of the dyebath is preferably adjusted to a weakly acid or neutral reaction, and is more preferably held at pH 4.5-6. For the dyeing of wool a lower pH is preferred, more particularly in the range of pH 4-5.5. Using an impregnation process, any conventional method is suitable, whereby the substrate is impregnated by an aqueous dye liquor or paste, for example by a dipping, padding or printing process. Subsequently, the obtained dyeing is fixed in accordance with conventional means, e.g., by the cold dwell method suitably at temperatures of from 15°-40° C., preferably at 20°-30° C., or by steaming for example at 100°-105° C.

The dye mixtures according to the invention are well suited for using in exhaust dyeing wool and/or synthetic polyamide, e.g., in stock-, hank- or piece-dyeing; furthermore, in conventional as well as in special printing processes such as displace or resist processes; in continuous carpet dyeing, differential dyeing and space dyeing and in pH-controlled dyeing processes.

Due to the notably good levelness of their dyeing behaviour, these dye mixtures are particularly suited for the exhaust and immersion processes.

With the above mentioned dye mixtures, optimum dyeings, especially on natural and synthetic polyamides, are obtained which show good constancy in shade, high yield in tinctorial strength, very good fastness properties and a notably good migrating power. These dyeings do not show catalytic fading. Their colorimetrically calculated recipes, even when done by computers, are well reproducible. It has been found that these characteristics are a surprising result of the specific mixture of dyes of this invention.

Furthermore, the dyes are compatible with conventional dyeing auxiliaries, such as wetting agents, levelling agents, carriers, thickening agents and absorption assistants. In addition, the dyeings thus obtained can be treated with common finishing agents such as antistatic agents, softening agents, agents to improve the sewability or raising assistants.

The following examples further serve to illustrate the invention. In the examples all parts and percentages are by weight unless indicated to the contrary. The temperatures are in degrees Centigrade. In the Application Examples the dyestuff components are used in commercial powder form and the amounts of dye component given in parts or as percent refer to the concentration of pure dyestuff based on the dry weight of substrate.

PREPARATION EXAMPLE

44 Parts of the disazo dyestuff of formula (1a)

which may be prepared in accordance with the method described in Example 1 of U.S. Pat. No. 4,384,870, are dissolved in 500 parts of water at 60° by the addition of 30% sodium hydroxide solution to adjust the pH of the mixture at 10. To this solution 30 parts of n-butylene oxide-1,2 are added whilst stirring, and the reaction temperature is elevated to 62°-65°. Simultaneously, the pH is maintained at 10-10.5 by adding 30% sodium hydroxide solution. After 15 to 20 hours at 62°-65°, the etherification is complete. The precipitation of the dyestuff is completed by added sodium chloride. The dyestuff is isolated by filtration, washed with 10% sodium chloride solution and dried. The disazo dye which, in free acid form, corresponds to formula (1b)

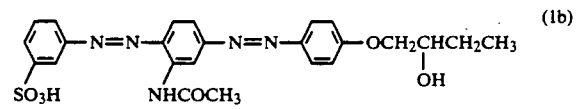

is obtained in sodium salt form. It dyes natural and synthetic polyamides a yellow shade.

When a mixture of 1-aminobenzene-3- and -4-sulphonic acids (in a ratio of approximately 1:1) is used instead of 1-aminobenzene-3-sulphonic acid to prepare the starting dye (1a) and otherwise etherification is carried out in accordance with the method described above, the corresponding dye mixture is obtained. It dyes natural and synthetic polyamides a yellow shade.

By analogy with the method described in the Preparation Example, using appropriate starting compounds, further compounds of formula Ia may be prepared which are listed in the following Table. They correspond to formula IA,

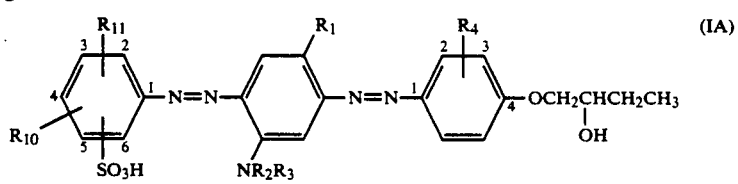

in which the symbols are as defined in the Table below. In the last column J of this Table the shade of the dyeings on natural and synthetic polyamides obtained with each of Compounds 2 to 10 is given whereby a is yellow and
b is brownish orange.

TABLE

| | | Compounds of formula IA | | | | | |
|---|---|---|---|---|---|---|---|
| Cpd. No. | SO3H in position | R10, R11 (position) | R1 | R2 | R3 | R4 (position) | J |
| 2 | 4 | H | H | —COCH3 | H | H | a |
| 3 | 3 | H | H | —COCH3 | H | 3-CH3 | a |
| 4 | 3 | H | H | —CONH2 | H | H | b |
| 5 | 4 | H | CH3 | —COCH3 | H | 2-CH3 | a |
| 6 | 3 | H | H | —COCH3 | CH3 | H | a |
| 7 | 4 | 2-CH3 | H | —COCH3 | H | H | a |
| 8 | 5 | 2-CH3 | H | —COCH3 | H | 3-CH3 | a |
| 9 | 4 | 2-Cl | H | —COCH3 | CH3 | H | a |
| 10 | 4 | 2,5-di-CH3 | H | —COCH3 | H | H | b |

In the following Application Examples in which the mixtures according to the invention are used, the following individual dyestuffs are employed:

A: a yellow component of formula Ia having the formula (1b) according to the Preparation Example;

B: a red component of formula II consisting of a mixture of two dyes (in a ratio of approximately 1:1) having the formulae

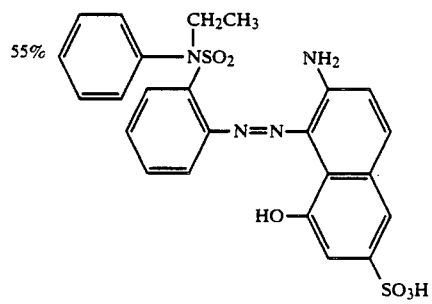

and

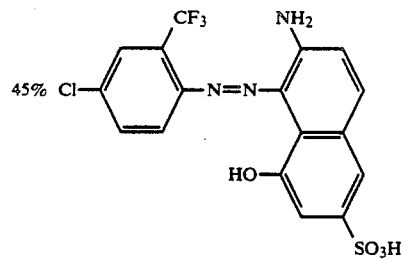

C: a blue component of formula III consisting of a mixture of two dyes (in a ratio of approximately 1:1) having the formulae

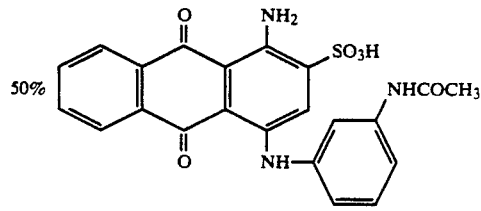

and

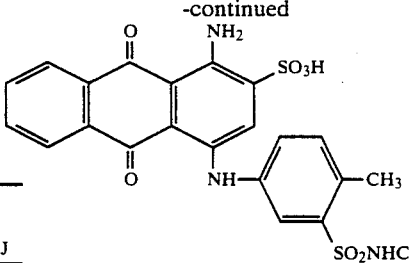

IC

D: a blue component of formula III having the formula

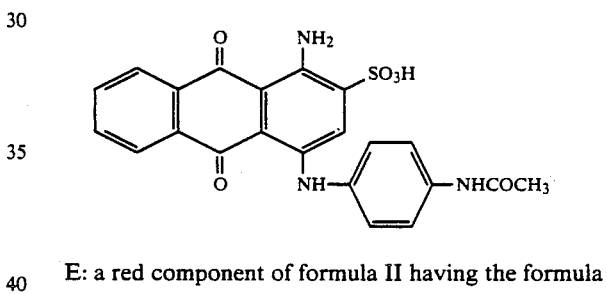

E: a red component of formula II having the formula

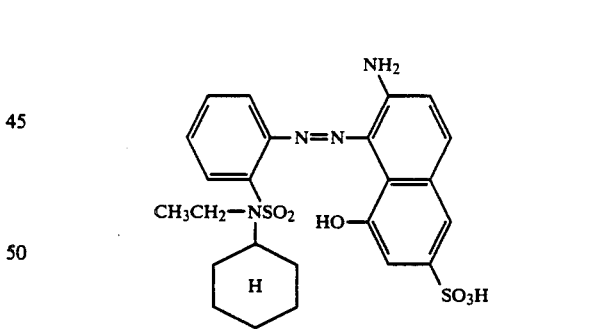

F: a blue component of formula III consisting of a mixture of dyes IC and IIC according to C but using 90% IC together with 10% IIC;

G: a yellow component of formula Ib having the formula

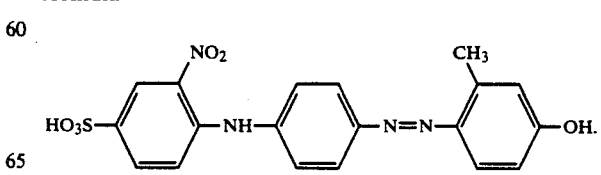

Each of the individual dyestuffs of components A to G is in sodium salt form.

In any dye mixture used in the following Application Examples, the dye of formula (1b) as yellow component A can be replaced with each of Compounds 2 to 10 set forth in the Table above. Each of Compounds 2 to 10 is used in sodium salt form.

APPLICATION EXAMPLE 1

Exhaust Dyeing on Polyamide Fabric

100 Parts of pre-wetted synthetic polyamide, for example polyamide 6.6 fabric, are entered at 40° into a dyebath consisting of 4000 parts of water, 10 parts of anhydrous sodium sulphate and a dye mixture containing
0.07% of A
0.05% of B and
0.03% of C.

The dye liquor is heated over the course of 30 minutes to boiling temperature and kept at this temperature for 1 hour. 4 Parts of glacial acetic acid are then added thereto and dyeing is completed with heating for a further 30 minutes at boiling temperature. During dyeing, the water that evaporates is continuously replaced. The nylon cloth dyed in a brown shade is then removed from the liquor, rinsed with water and dried.

Wool or wool/synthetic polyamide blends may also be dyed by the same process.

The polyamide dyeings thus obtained are evenly dyed and show good light fastness and wet fastness properties.

APPLICATION EXAMPLE 2

Following the method described in Example 1 but using a dye mixture containing
0.02% of A
0.025% of B and
0.025% of D,
an evenly dyed nylon cloth is obtained having a grey shade and good fastness properties.

APPLICATION EXAMPLE 3

Printing of Polyamide Fabric

Polyamide 6 is printed with a printing paste containing:
15 parts of a dye mixture consisting of
  5.7 parts of A
  6.0 parts of E and
  3.3 parts of F,
50 parts of urea
50 parts of a solubilising agent (e.g., thiodiethylene glycol)
305 parts of water
500 parts of a thickening agent (for example based on carob bean gum in form of a 10% aqueous solution)
20 parts of an acid-donating agent (e.g., ammonium tartrate) and
60 parts of thiourea.

The printed textile goods are steamed for 40 minutes at 102° (saturated steam), rinsed cold, washed at 60° with a dilute solution of a conventional detergent for 5 minutes, and then rinsed again with cold water. A brown print having good light and wet fastness properties is obtained.

APPLICATION EXAMPLE 4

Continuous Dyeing of Polyamide Carpet

Polyamide (e.g., regular polyamide 6.6 fibres) carpet is wetted with a composition consisting of 1.5 parts of a product obtained by reacting 4 moles of ethylene oxide with 1 mole of decyl alcohol and 998.5 parts of water and squeezed to impregnate the wetting agent and reduce the total pick-up to 90% (by weight of the dry substrate).

A dye liquor consisting of
0.15 parts of a dye mixture containing
  0.035 parts of A
  0.035 parts of G
  0.05 parts of B and
  0.03 parts of F,
1.5 parts of a thickener based on guar (e.g., Celca Gum D-49-D)
1.5 parts of decyl alcohol ethoxylated with 4 moles of ethylene oxide per mole of alcohol,
96.85 parts of water, and
a sufficient amount of monosodium phosphate to adjust the pH of the liquor at 5,
is applied to the wetted polyamide carpet using a continuous applicator (e.g., Küsters) to achieve a wet pick-up of 500% (based on dry weight of the substrate). The polyamide carpet thus treated is then steamed in a vertical streamer for 7 minutes at 102°, rinsed with warm water at 40° and then dried.

When continuous impregnation is effected to a pick-up of 300% or 600%, lower or deeper dyeings may be obtained. Instead of a vertical steamer, a horizontal steamer may be employed.

Very evenly dyed brown dyeings are obtained which have good light fastness (even when exposed to light in the heat) and wet fastness properties.

The following Application Examples 5 to 14 illustrate conventional or more specific dyeing or printing methods for polyamide carpet in which particular assisting agents are used. These assistants may be listed as follows:

Levelling agents LA1) to LA6), where

LA1) is an amphoteric levelling agent consisting essentially of a quaternary sulphonated higher amino fatty acid amide;

LA2) is an anionic levelling agent consisting essentially of a saturated $C_{12-13}$-alcohol polyglycol ethersulphate as sodium salt;

LA3) is an anionic levelling agent consisting essentially of a mixture consisting of
sulphonated polyphenyl sulfone,
ethoxylated amino $C_{22}$ fatty amine and
ethoxylated higher alkyl alcohol;

LA4) is an amphoteric levelling agent consisting essentially of a sulphated ethoxylated $C_{18-22}$ fatty amine as ammonium salt;

LA5) is a cation-active levelling agent consisting essentially of the reaction product of 1 mole $C_{22}$ fatty acid aminopropylamine and 105 moles ethylene oxide;

LA6) is a non-ionic levelling agent consisting essentially of a mixture consisting of
tridecylalcohol polyglycol ether
LA1) and
hexylene glycol.

Acid-donating agents AD1) to AD3), where

AD1) consists essentially of butyrolactone;

AD2) consists essentially of a glycol mono- or di-ester of formic acid;

AD3) consists essentially of a mixture of $C_{4-6}$ dicarboxylic acids.

Reserving agent RA1), where

RA1) consists essentially of the quaternary reaction product of a higher fatty amine reacted with ethylene oxide and 1 mole styrene oxide.

APPLICATION EXAMPLES 5 TO 8

Exhaust Dyeing

In each of these Application Examples a liquor to goods ratio of 20:1 is used.

EXAMPLE 5

Differential Dyeing on Polyamide 6.6

50 Parts of polyamide carpet of deep dye, regular, basic fibres are used. The aqueous liquor contains
a trichromatic dye mixture consisting of
  0.16% of A
  0.15% of B and
  0.30% of F,
a basic dye mixture consisting of
  0.006% of C.I. Basic Yellow 45
  0.002% of C.I. Basic Red 23 and
  0.01% of C.I. Basic Blue 22,
1% of LA5), and
1 g/l of AD2) which is added when starting the dyeing process.

The pH of the liquor is 7 at the beginning. During the course of dyeing which is effected at 98° for 60 minutes, the pH of the liquor decreases to 5.5.

The resulting grey-rose polyamide carpet is very evenly dyed.

EXAMPLE 6

Dyeing is effected by analogy with the method described in Example 5 but using 1 g/l of AD1) instead of AD2) which is added to the dyebath only at boiling temperature. The dyeing process is started at pH 8.0 and the liquor is heated to 98° within 30 minutes. Then the appropriate amount of AD1) is added whereby the pH of 8 when starting is adjusted to 6 over 30 minutes.

EXAMPLE 7

Plain Dyeing on Polyamide 6.6

50 Parts of polyamide carpet of regular fibres are employed. The aqueous dye liquor contains
a trichromatic dye mixture which consists of
  0.044% of A
  0.035% of B and
  0.028% of F,
1% LA5), and
1 g/l of AD1).

Dyeing is effected in accordance with the method described in Example 6. An evenly dyed pale-brown carpet is obtained.

EXAMPLE 8

Plain Dyeing on Polyamide 6

50 Parts of polyamide carpet of deep dye fibres are employed. The aqueous liquor contains
a trichromatic dye mixture consisting of
  0.014% of A
  0.025% of B and
  0.08% of F,
1% of LA3), and
1 g/l of AD2) which is added from the beginning.

Dyeing is carried out starting at pH 8.0 and 20°. In accordance with a low temperature dyeing process, the bath is heated to 60° and is kept at 60° for 60 minutes. At the end of the dyeing procedure, the pH of the liquor is 5.5. An evenly dyed carpet of grey-blue shade is obtained.

APPLICATION EXAMPLES 9 TO 11

Continuous and Semi-Continuous Dyeing

In each of these Application Examples (Examples 9 and 10 show a continuous and Example 11 a semi-continuous process), the liquor to goods ratio is 2.8:1.

EXAMPLE 9

—Differential Dyeing on Polyamide 6

A polyamide carpet of deep dye, regular, basic fibres is used. A dye liquor consisting of
  0.395 parts of a trichromatic dye mixture containing
    0.055 parts of A
    0.27 parts of B and
    0.07 parts of F,
  1.06 parts of a basic dye mixture containing
    0.06 parts of C.I. Basic Yellow 45
    0.10 parts of C.I. Basic Red 23 and
    0.90 parts of C.I. Basic Blue 22,
  1.5 g/l of LA6),
  1.5 g/l of AD3), and
  2.0 g/l of AD2),
is applied to the polyamide carpet at pH 7.5 and a pick-up of 280% (based on the dry weight of substrate) is achieved. The dyed carpet is then steamed for 5 minutes at 102° (saturated steam). The resultant carpet is evenly dyed in a reddish violet-blue tone.

EXAMPLE 10—Plain Dyeing of Polyamide 6.6

A polyamide carpet of regular fibres is used. A dye liquor consisting of
  0.62 parts of a trichromatic dye mixture containing
    0.16 parts of A
    0.24 parts of B and
    0.22 parts of F,
  1 g/l of LA3),
  2 g/l of LA6),
  2 g/l of LA2), and
  1 g/l of AD3),
is applied to the polyamide carpet at pH 7.0. A pick-up to 250% (based on the dry weight of substrate) is achieved. Then the dyeing is steamed at 102° (saturated steam) for fixation. A brown dyeing is obtained showing the same shade at the fibre ends as well as on both sides due to the homogeneous dispersing effect of colour promoting good ground/pile tip levelness.

EXAMPLE 11—Semi-Continuous Plain Dyeing on Polyamide 6.6

Carpet material of regular fibres is used. A dye liquor consisting of
  0.94 parts of a trichromatic dye mixture containing
    0.38 parts of A
    0.34 parts of B and
    0.22 parts of F,
  2 g/l of LA2),
  4 g/l of LA4), and
  1 g/l acetic acid 60%,
is applied to the carpet and a pick-up of 250% is achieved. The retention time is 20 hours at room temperature. An evenly dyed brown carpet is obtained which show no difference in shade with respect to both sides and the fibre ends.

APPLICATION EXAMPLES 12-15

Printing Processes

EXAMPLE 12—Conventional Printing of Polyamide 6

A carpet material of polyamide 6 endless velvet is employed. Fond dyeing is effected by padding with a liquor containing
0.23 parts of a dye mixture consisting of
  0.02 parts of A
  0.10 parts of B and
  0.11 parts of F,
1 g/l of LA2), and
2 g/l of a thickening agent (based on locust bean gum),
at pH 5.0 to a pick-up of 100%.

Subsequently, overprinting with a rotary screen is effected using a printing paste which consists of
0.76 parts of a dye mixture containing
  0.2 parts of A
  0.11 parts of B and
  0.45 parts of F,
400 g/kg of an alginate thickening agent 4%
4 g/kg of LA1), and
5 cm³/kg of acetic acid 80%.

Dyeing is effected by padding the carpet to yield a pale-blue fond followed by printing of designs using the green overprinting paste and fixing the resultant prints with saturated steam for 10 minutes.

A pale-blue carpet fond with green printing designs is obtained showing good penetration and a homogeneous colour distribution with respect to the printing appearance.

EXAMPLE 13—Displace Printing

A carpet material of polyamide 6.6 heat set yarns (velvet) is used. Fond dyeing is effected by padding with a liquor containing
4.12 parts of a dye mixture consisting of
  0.64 parts of C.I. Acid Yellow 235
  0.28 parts of C.I. Acid Red 399 and
  3.2 parts of C.I. Acid Black 218
100 g/l of an alginate thickening agent 4%
3 g/l of LA1), and
1 g/l of a defoaming agent,
at pH 5.0 to a pick-up of 100%.

Overprinting is effected with a rotary screen using a printing paste which consists of
1.77 parts of a dye mixture containing
  1.0 parts of A
  0.6 parts of B and
  0.17 parts of F,
10 g/kg of RA1), and
500 g/kg of an alginate thickener 4%,
at pH 7.0.

The printing process is analogous to that described in Example 12. A carpet with a dark-grey fond and clear yellowish-brown printing designs is obtained showing a homogeneous colour distribution in the structure of the fibres.

EXAMPLE 14—Spray Printing

A carpet material of polyamide 6.6 heat set velvet is employed. A printing paste consisting of
0.126 parts of a dye mixture containing
  0.045 parts of A
  0.045 parts of B and
  0.036 parts of F, an appropriate amount of citric acid to adjust the pH at 4.5,
an appropriate amount of thickening agent to yield a viscosity of 300 cps, and
2 g/l of LA5),
is applied to achieve a pick-up of 350%. The carpet is locally printed using a spray printing machine and fixed with saturated steam for 10 minutes. A brown printing pattern is obtained.

An optimum colour distribution is obtained without any differences in shade regarding the pile ground/pile tip levelness.

EXAMPLE 15

The printing process according to Example 14 is repeated with the exception that printing is effected over the whole surface without a pattern instead of locally printing, whereby a plain brown carpet is obtained. The whole carpet surface is evenly dyed and the pile levelness is notably good.

What is claimed is:

1. A dye mixture comprising
(i) as a yellow component, at least one compound of the formula

or a salt thereof, wherein
  $R_1$ is hydrogen, $C_{1-4}$alkoxy, $C_{1-4}$alkyl or $C_{1-4}$alkyl monosubstituted by halo,
  $R_2$ is $C_{1-4}$alkyl or —$COR_6$,
    wherein $R_6$ is $C_{1-6}$alkyl, $C_{1-6}$alkoxy or —$NR_7R_8$,
    wherein each of $R_7$ and $R_8$ is independently hydrogen, $C_{1-6}$alkyl or $C_{2-6}$alkyl monosubstituted by hydroxy,
  $R_4$ is hydrogen, halo, $C_{1-4}$alkyl, $C_{1-4}$alkoxy or —$NR_3R_9$,
  $R_5$ is $C_{1-4}$alkyl or $C_{2-6}$alkyl monosubstituted by hydroxy,
  $R_{10}$ is hydrogen, halo, $C_{1-4}$alkyl, $C_{1-4}$alkoxy or —$NR_3R_9$, and
  $R_{11}$ is hydrogen, halo, $C_{1-4}$alkyl or $C_{1-4}$alkoxy, wherein
    each $R_3$ is independently hydrogen or $C_{1-4}$alkyl, and
    each $R_9$ is independently ($C_{1-6}$alkyl) carbonyl or ($C_{1-6}$alkoxy)carbonyl,
(ii) as a red component, at least one compound of the formula

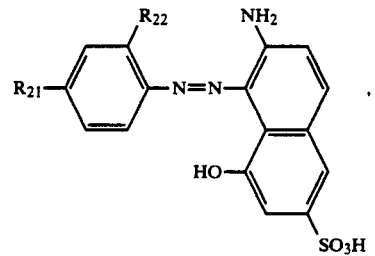

or a salt thereof, wherein $R_{21}$ is hydrogen, halo or $(C_{1-4}alkyl)$carbonylamino, and $R_{22}$ is trifluoromethyl, $-SO_2Z_1$ or $-SO_2Z_2$, wherein
  $Z_1$ is phenyl, phenoxy or $-NR_{19}R_{20}$, wherein
    $R_{19}$ is methyl or ethyl, and
    $R_{20}$ is phenyl or cyclohexyl, and
  $Z_2$ is $-N(C_4H_9)_2$ or

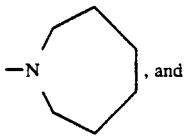, and (iii) as a blue component, at least one compound of the formula

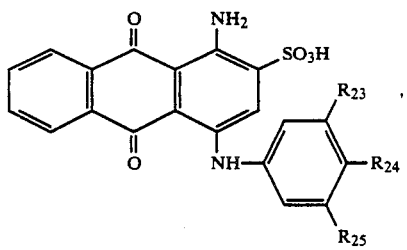

or a salt thereof, wherein
$R_{23}$ is hydrogen or methyl, and
one of $R_{24}$ and $R_{25}$ is $C_{2-4}$hydroxyalkylsulfamoyl or $-NR_{26}-COC_{1-4}alkyl$ and the other is hydrogen or methyl, wherein
$R_{26}$ is hydrogen, methyl or ethyl.

2. A dye mixture according to claim 1 comprising
(i) as a yellow component, at least one compound of the formula

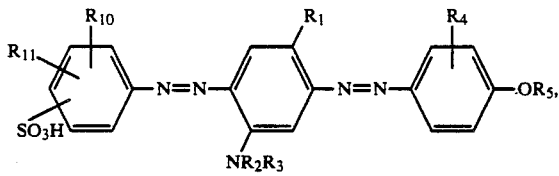

or a salt thereof the cation of which is non-chromophoric, (ii) as a red component, at least one compound of the formula

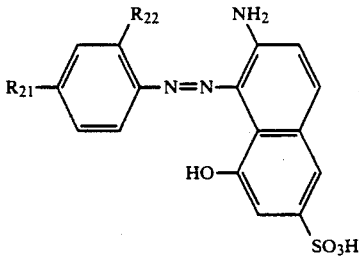

or a salt thereof the cation of which is non-chromophoric, and (iii) as a blue component, at least one compound of the formula

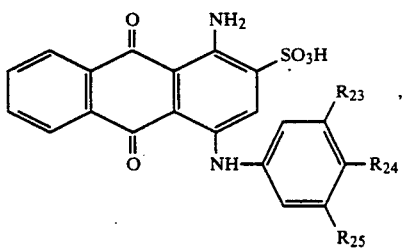

or a salt thereof the cation of which is non-chromophoric.

3. A dye mixture according to claim 2 wherein
each cation is independently lithium, sodium, potassium, ammonium, methylammonium, dimethylammonium, trimethylammonium, tetramethylammonium, triethylammonium, ethanolammonium, diethanolammonium or triethanolammonium,
each halo is independently fluoro, chloro or bromo, and
the hydroxy group of each hydroxyalkyl group attached to a nitrogen or oxygen atom is separated from said nitrogen or oxygen atom by at least two carbon atoms.

4. A dye mixture according to claim 2 consisting essentially of
(i) (a) as a yellow component, at least one compound of the formula

or a salt thereof the cation of which is non-chromophoric, and
(b) at least one yellow to orange compound of the formulae

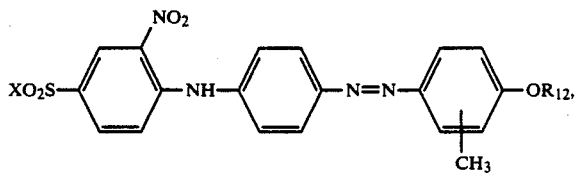

-continued

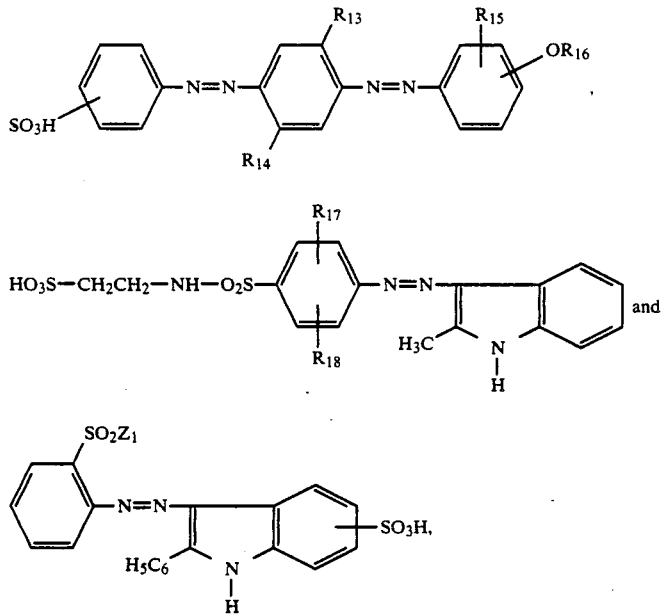

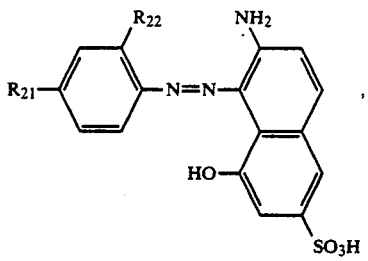

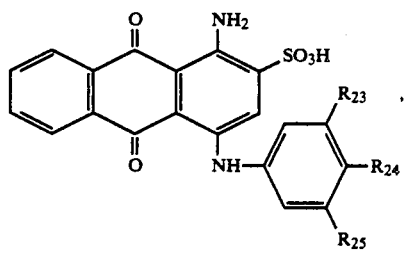

or a salt thereof the cation of which is non-chromophoric, wherein $R_{12}$ is hydrogen or $C_{1-4}$alkyl, each of $R_{13}$, $R_{14}$ and $R_{15}$ is independently hydrogen, $C_{1-4}$alkyl or $C_{1-4}$alkoxy, $R_{16}$ is $C_{1-4}$alkyl or $C_{2-4}$hydroxyalkyl, each of $R_{17}$ and $R_{18}$ is independently hydrogen, halo or $C_{1-4}$alkyl, X is hydroxy or $C_{1-4}$alkylsulfonylamino, and $Z_1$ is phenyl, phenoxy or $-NR_{19}R_{20}$, wherein $R_{19}$ is methyl or ethyl, and $R_{20}$ is phenyl or cyclohexyl, (ii) as a red component, at least one compound of the formula

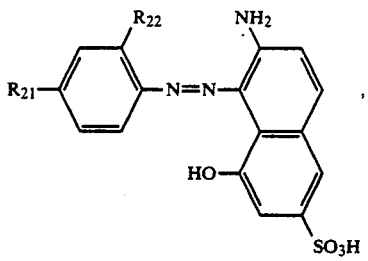

or a salt thereof the cation of which is non-chromophoric, and (iii) as a blue component, at least one compound of the formula

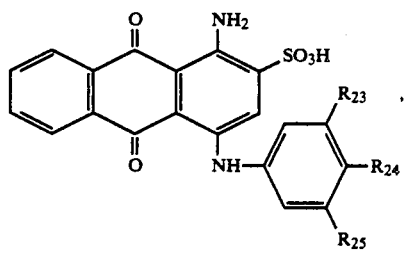

or a salt thereof the cation of which is non-chromophoric.

5. A dye mixture according to claim 4 wherein each cation is independently lithium, sodium, potassium, ammonium, methylammonium, dimethylammonium, trimethylammonium, tetramethylammonium, triethylammonium, ethanolammonium, diethanolammonium or triethanolammonium, each halo is independently fluoro, chloro or bromo, and the hydroxy group of each hydroxyalkyl group attached to a nitrogen or oxygen atom is separated from said nitrogen or oxygen atom by at least two carbon atoms.

6. A dye mixture according to claim 4 comprising a compound of the formula

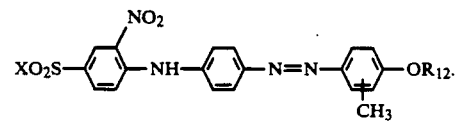

7. A dye mixture according to claim 4 wherein Component (i) consists of (a) one compound of the formula

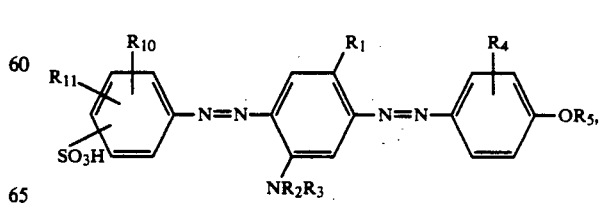

or a salt thereof the cation of which is non-chromophoric, and (b) at least one compound of the formulae

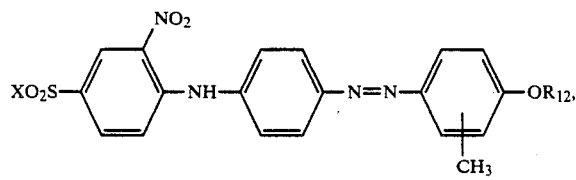

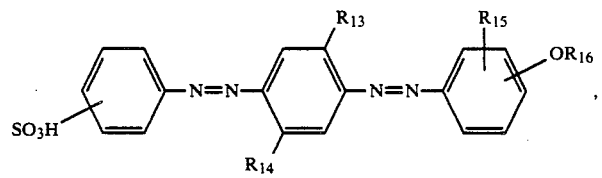

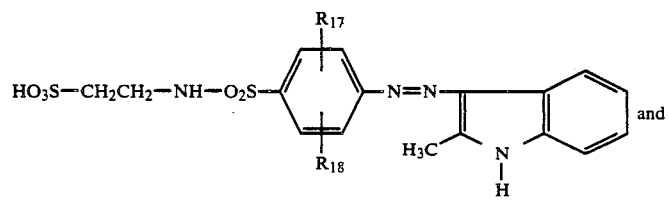

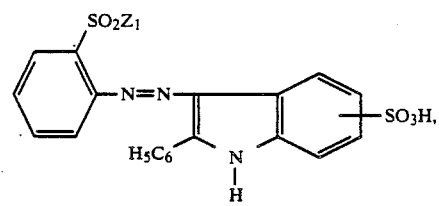

or a salt thereof the cation of which is non-chromophoric, and containing at least 10 parts by weight of Component (i), 5 to 85 parts by weight of Component (ii) and 5 to 85 parts by weight of Component (iii), based upon 100 parts total weight of Components (i)–(iii) and calculated as if each component were in sodium salt form.

8. A trichromatic dye mixture according to claim 2 consisting of
(i) as the yellow component, at least one compound of the formula

or a salt thereof the cation of which is non-chromophoric,
(ii) as the red component, at least one compound of the formula

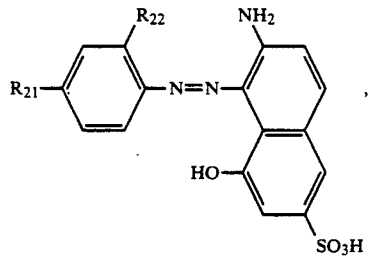

or a salt thereof the cation of which is non-chromophoric, and
(iii) as the blue component, at least one compound of the formula

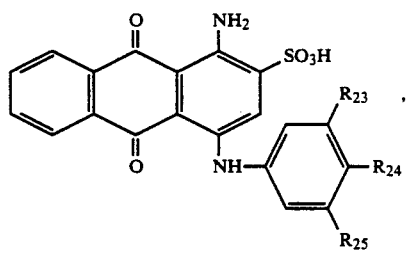

or a salt thereof the cation of which is non-chromophoric.

9. A trichromatic dye mixture according to claim 8 wherein Component (i) consists of one compound of the formula

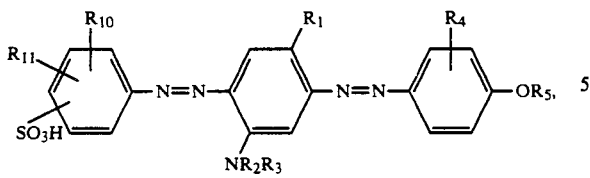

or a salt thereof the cation of which is non-chromophoric, and containing at least 10 parts by weight of Component (i), 5 to 85 parts by weight of Component (ii) and 5 to 85 parts by weight of Component (iii), based upon 100 parts total weight of Components (i)–(iii) and calculated as if each component were in sodium salt form.

10. A trichromatic dye mixture according to claim 9 wherein each cation is independently lithium, sodium, potassium, ammonium, methylammonium, dimethylammonium, trimethylammonium, tetramethylammonium, triethylammonium, ethanolammonium, diethanolammonium or triethanolammonium, each halo is independently fluoro, chloro or bromo, and the hydroxy group of each hydroxyalkyl group attached to a nitrogen or oxygen atom is separated from said nitrogen or oxygen atom by at least two carbon atoms.

11. A trichromatic dye mixture according to claim 10 wherein $R_1$ is hydrogen, methyl or methoxy, $R_2$ is —CO-$R_{6b}$, wherein $R_{6b}$ is $C_{1-2}$alkyl or amino, each $R_3$ is independently hydrogen or methyl, $R_4$ is hydrogen, chloro, methyl, methoxy or acetamido, $R_5$ is methyl, ethyl or $C_{3-5}$alkyl monosubstituted by hydroxy, $R_{10}$ is hydrogen, chloro, methyl, methoxy or acetamido, $R_{11}$ is hydrogen, $R_{21}$ is hydrogen, chloro or acetamido, $R_{23}$ is hydrogen, and one of $R_{24}$ and $R_{25}$ is acetamido or propionamido and the other is hydrogen, or $R_{23}$ is hydrogen or methyl, $R_{24}$ is methyl, and $R_{25}$ is 2-hydroxyethylsulfamoyl, and the sulfo group of Component (i) is meta or para to the —N=N— radical.

12. A trichromatic dye mixture according to claim 9 containing 10–60 parts by weight of Component (i), 20–70 parts by weight of Component (ii) and 10–50 parts by weight of Component (iii), based upon 100 parts total weight of Components (i)–(iii) and calculated as if each component were in sodium salt form.

13. A natural or synthetic polyamide substrate to which a trichromatic dye mixture according to claim 9 was applied.

14. A process for dyeing or printing a natural or synthetic polyamide substrate comprising applying to a nitrogen-containing organic substrate an anionic dye mixture comprising (i) as a yellow component, at least one compound of the formula

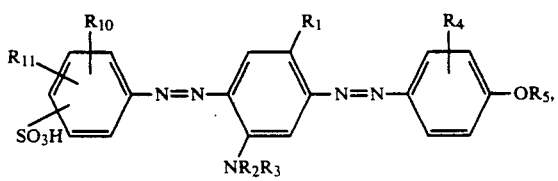

or a salt thereof, wherein $R_1$ is hydrogen, $C_{1-4}$alkoxy, $C_{1-4}$alkyl or $C_{1-4}$alkyl monosubstituted by halo, $R_2$ is $C_{1-4}$alkyl or —$COR_6$, wherein
  $R_6$ is $C_{1-6}$alkyl, $C_{1-6}$alkoxy or —$NR_7R_8$,
    wherein each of $R_7$ and $R_8$ is independently hydrogen, $C_{1-6}$alkyl or $C_{2-6}$alkyl mono-substituted by hydroxy, $R_4$ is hydrogen, halo, $C_{1-4}$alkyl, $C_{1-4}$alkoxy or —$NR_3R_9$, $R_5$ is $C_{1-4}$alkyl or $C_{2-6}$alkyl monosubstituted by hydroxy, $R_{10}$ is hydrogen, halo, $C_{1-4}$alkyl, $C_{1-4}$alkoxy or —$NR_3R_9$, and $R_{11}$ is hydrogen, halo, $C_{1-4}$alkyl or $C_{1-4}$alkoxy, wherein
  each $R_3$ is independently hydrogen or $C_{1-4}$alkyl, and
  each $R_9$ is independently ($C_{1-6}$alkyl)carbonyl or ($C_{1-6}$alkoxy)carbonyl, (ii) as a red component, at least one compound of the formula

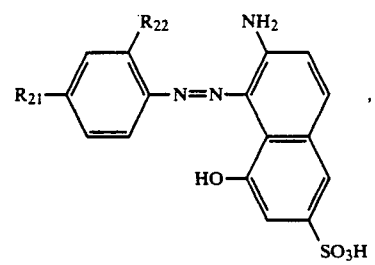

or a salt thereof, wherein $R_{21}$ is hydrogen, halo or ($C_{1-4}$alkyl)carbonylamino, and $R_{22}$ is trifluoromethyl, —$SO_2Z_1$ or —$SO_2Z_2$, wherein
  $Z_1$ is phenyl, phenoxy or —$NR_{19}R_{20}$, wherein
    $R_{19}$ is methyl or ethyl, and
    $R_{20}$ is phenyl or cyclohexyl, and
  $Z_2$ is —$N(C_4H_9)_2$ or

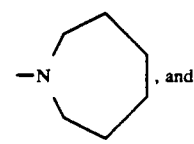, and (iii) as a blue component, at least one compound of the formula

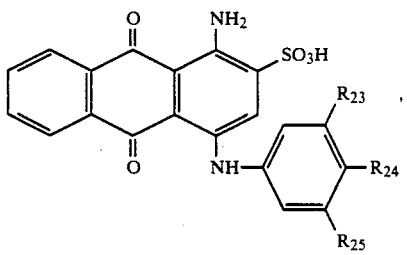

or a salt thereof, wherein
R$_{23}$ is hydrogen or methyl, and
one of R$_{24}$ and R$_{25}$ is C$_{2-4}$hydroxyalkylsulfamoyl or —NR$_{26}$-COC$_{1-4}$alkyl and the other is hydrogen or methyl, wherein R$_{26}$ is hydrogen, methyl or ethyl.

15. A process according to claim 14 comprising applying an anionic dye mixture comprising
(i) as a yellow component, at least one compound of the formula

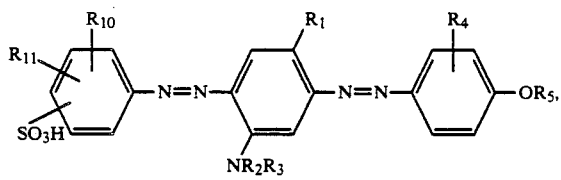

or a salt thereof the cation of which is non-chromophoric,
(ii) as a red component, at least one compound of the formula

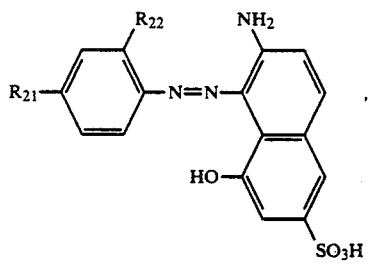

or a salt thereof the cation of which is non-chromophoric, and
(iii) as a blue component, at least one compound of the formula

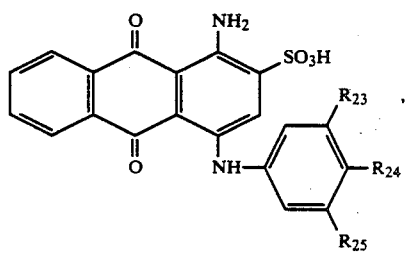

or a salt thereof the cation of which is non-chromophoric.

16. A process according to claim 15 wherein each cation is independently lithium, sodium, potassium, ammonium, methylammonium, dimethylammonium, trimethylammonium, tetramethylammonium, triethylammonium, ethanolammonium, diethanolammonium or triethanolammonium,
each halo is independently fluoro, chloro or bromo, and the hydroxy group of each hydroxyalkyl group attached to a nitrogen or oxygen atom is separated from said nitrogen or oxygen atom by at least two carbon atoms.

17. A process according to claim 15 wherein R$_5$ is C$_{2-6}$alkyl monosubstituted by hydroxy.

18. A process according to claim 15 wherein
R$_1$ is hydrogen, methyl or methoxy,
R$_2$ is —COR$_{6b}$, wherein R$_{6b}$ is C$_{1-2}$alkyl or amino,
each of R$_3$ and R$_4$ is independently hydrogen or methyl,
R$_5$ is methyl or C$_4$alkyl monosubstituted by hydroxy,
R$_{10}$ is hydrogen, chloro, methyl, methoxy or acetamido,
R$_{11}$ is hydrogen, and
the sulfo group is meta or para to the —N=N— radical.

19. A process according to claim 18 wherein
each of R$_1$, R$_3$ and R$_4$ is hydrogen, and
R$_5$ is

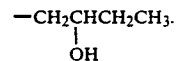

20. A process according to claim 19 wherein
R$_{10}$ is hydrogen, and
the sulfo group is meta to the —N=N— radical.

21. A process according to claim 15 wherein
R$_{21}$ is hydrogen, chloro or acetamido.

22. A process according to claim 21 wherein
R$_{21}$ is hydrogen, and
R$_{22}$ is —SO$_2$Z$_1$ or —SO$_2$Z$_2$.

23. A process according to claim 15 wherein
R$_{23}$ is hydrogen,
one of R$_{24}$ and R$_{25}$ is acetamido or propionamido and the other is hydrogen, or
R$_{23}$ is hydrogen or methyl,
R$_{24}$ is methyl, and
R$_{25}$ is 2-hydroxyethylsulfamoyl.

24. A process according to claim 15 wherein Component (i) consists of (a) one compound of the formula

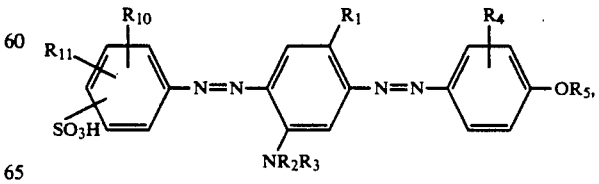

or a salt thereof the cation of which is non-chromophoric, and (b) at least one compound of the formulae

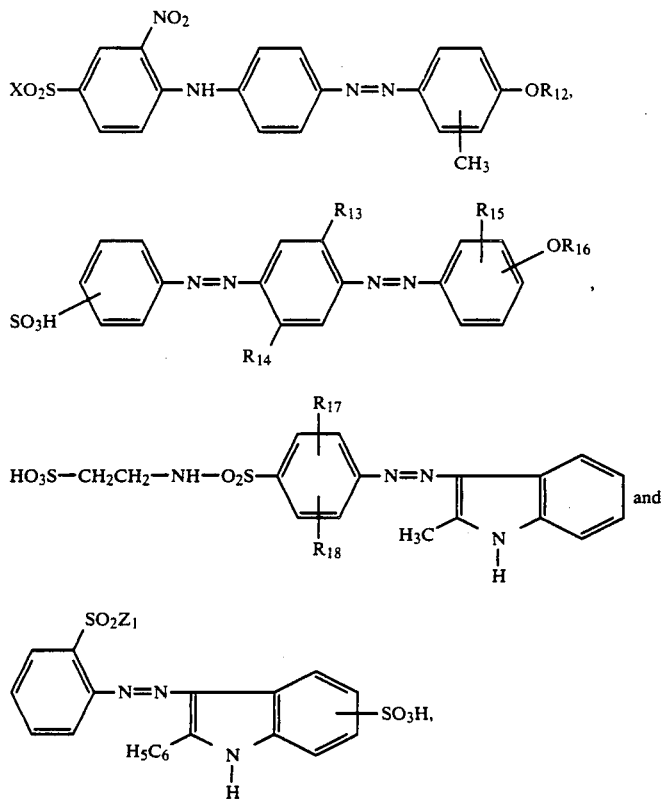

or a salt thereof the cation of which is non-chromophoric, wherein
  $R_{12}$ is hydrogen or $C_{1-4}$alkyl,
  each of $R_{13}$, $R_{14}$ and $R_{15}$ is independently hydrogen, $C_{1-4}$alkyl or $C_{1-4}$alkoxy,
  $R_{16}$ is $C_{1-4}$alkyl or $C_{2-4}$hydroxyalkyl,
  each of $R_{17}$ and $R_{18}$ is independently hydrogen, halo or $C_{1-4}$alkyl,
  X is hydroxy or $C_{1-4}$alkylsulfonylamino, and
  $Z_1$ is phenyl, phenoxy or —$NR_{19}R_{20}$, wherein
    $R_{19}$ is methyl or ethyl, and
    $R_{20}$ is phenyl or cyclohexyl.

25. A process according to claim 24 wherein Component (i) consists of (a) a compound of the formula or a salt thereof the cation of which is non-chromophoric, and (b) a compound of the formula or a salt thereof the cation of which is non-chromophoric.

26. A process according to claim 15 wherein the substrate is a carpet material comprising wool or a synthetic polyamide.

27. A process according to claim 15 comprising applying a trichromatic dye mixture consisting of
(i) as the yellow component, one compound of the formula or a salt thereof the cation of which is non-chromophoric,
(ii) as the red component, at least one compound of the formula or a salt thereof the cation of which is non-chromophoric, and
(iii) as the blue component, at least one compound of the formula

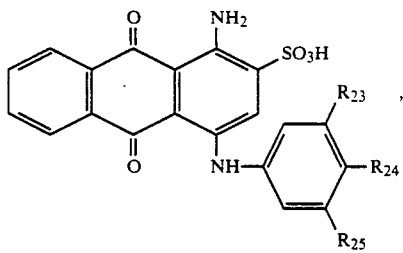

or a salt thereof the cation of which is non-chromophoric, and containing at least 10 parts by weight of Component (i), 5 to 85 parts by weight of Component (ii) and 5 to 85 parts by weight of Component (iii), based upon 100 parts total weight of Components (i)-(iii) and calculated as if each component were in sodium salt form.

28. A process according to claim 27 wherein
each cation is independently lithium, sodium, potassium, ammonium, methylammonium, dimethylammonium, trimethylammonium, tetramethylammonium, triethylammonium, ethanolammonium, diethanolammonium or triethanolammonium,
each halo is independently fluoro, chloro or bromo, and
the hydroxy group of each hydroxyalkyl group attached to a nitrogen or oxygen atom is separated from said nitrogen or oxygen atom by at least two carbon atoms.

29. A process according to claim 28 wherein
$R_1$ is hydrogen, methyl or methoxy,
$R_2$ is $-CO-R_{6b}$, wherein $R_{6b}$ is $C_{1-2}$alkyl or amino,
each $R_3$ is independently hydrogen or methyl,
$R_4$ is hydrogen, chloro, methyl, methoxy or acetamido,
$R_5$ is methyl, ethyl or $C_{3-5}$alkyl monosubstituted by hydroxy,
$R_{10}$ is hydrogen, chloro, methyl, methoxy or acetamido,
$R_{11}$ is hydrogen,
$R_{21}$ is hydrogen, chloro or acetamido,
$R_{23}$ is hydrogen, and
one of $R_{24}$ and $R_{25}$ is acetamido or propionamido and the other is hydrogen, or
$R_{23}$ is hydrogen or methyl,
$R_{24}$ is methyl, and
$R_{25}$ is 2-hydroxyethylsulfamoyl, and
the sulfo group of Component (i) is meta or para to the $-N=N-$ radical.

* * * * *